United States Patent
Peacock et al.

(10) Patent No.: US 7,870,316 B1
(45) Date of Patent: Jan. 11, 2011

(54) SYSTEM AND METHOD FOR PROVIDING AN INLINE DATA CONVERSION FOR MULTIPLEXED DATA STREAMS

(75) Inventors: Richard B. Peacock, West Chester, PA (US); William L. Weber, III, Eagleville, PA (US)

(73) Assignee: Unisys Corporation, Blue Bell, PA (US)

( * ) Notice: Subject to any disclaimer, the term of this patent is extended or adjusted under 35 U.S.C. 154(b) by 1016 days.

(21) Appl. No.: 11/648,017

(22) Filed: Dec. 29, 2006

(51) Int. Cl.
*G06F 13/12* (2006.01)
*G06F 13/00* (2006.01)

(52) U.S. Cl. .............................. 710/65; 710/29; 710/33; 712/200

(58) Field of Classification Search ............. 710/29–33, 710/65–71; 712/200, 208; 717/136
See application file for complete search history.

(56) References Cited

U.S. PATENT DOCUMENTS

| | | | | |
|---|---|---|---|---|
| 5,287,534 A | * | 2/1994 | Reuther et al. | 714/819 |
| 5,574,923 A | * | 11/1996 | Heeb et al. | 712/38 |
| 5,630,084 A | * | 5/1997 | Ikumi | 712/200 |
| 5,828,884 A | * | 10/1998 | Lee et al. | 717/141 |
| 5,867,690 A | * | 2/1999 | Lee et al. | 710/65 |
| 7,587,535 B2 | * | 9/2009 | Sawai | 710/62 |
| 2004/0059848 A1 | * | 3/2004 | Chang et al. | 710/65 |
| 2004/0221274 A1 | * | 11/2004 | Bross et al. | 717/136 |

\* cited by examiner

*Primary Examiner*—Christopher B Shin
(74) *Attorney, Agent, or Firm*—Richard J. Gregson; Robert P. Marley (57) ABSTRACT

A computing system having an apparatus for providing an inline data conversion processor. The inline data conversion processor includes a host processor interface, a network interface, a peripheral interface, and a packer stream address for defining a data transformation applied to a block of data as it passes between the host processor interface and the peripheral and network interfaces.

31 Claims, 7 Drawing Sheets

SYSTEM AND METHOD FOR PROVIDING AN INLINE DATA CONVERSION FOR MULTIPLEXED DATA STREAMS

FIELD OF THE INVENTION

The present invention relates generally to techniques for providing network communications between processing devices, and, in particular, to techniques for providing inline data conversion for multiplexed data streams.

BACKGROUND OF THE INVENTION

Computing systems are routinely connected to communications networks to facilitate remote access to data, processing resources, and application programs. This communications are facilitated by the use of standard communications transport protocols such as TCP/IP, UDP, and similar cooperative data transfer protocols. Computing systems also are routinely connected to peripheral devices such as mass storage devices that maintain data generated and used by applications. Peripheral devices may maintain this data within data structures that may differ from the various formats and data structures used by applications as well as formats and data structures used in network communications.

These formats and data structures used in the various components in a computing system may also change over time as the technology of various components evolves. For example, disk drives and similar storage devices store data using blocks, tracks, and sectors that relate to the physical media used for storage. These structures may vary as the size of the rotating platter, the density of the tracks, and transfer data rate change. Additionally, these same factors may combine with data buffer sizes within the peripheral devices and the system data transfer rate from peripheral devices to system memory to affect the data structures and formats used within a system.

Many applications may require support for user over an extended period of time during which the above components evolve requiring changes to the data formats and data structures using within a computing system. These changes typically require the applications to be re-written over time to accommodate these changes. In addition, the applications may need to support multiple formats and data structures that depend solely upon which peripheral devices, such as mass storage, devices are present on a given computing system at a particular point in time. All of these possible combinations create a need for manners to reformat data within a computing system in an efficient manner. This need may also include devices and processes that offload the reformatting operations from a system processor while not degrading data transfer rates between devices in the computing system. The present invention attempts to address many of these deficiencies within the prior art as noted above.

SUMMARY OF THE INVENTION

Problems in the prior art are addressed in accordance with the principles of the present invention by providing inline data conversion for multiplexed data streams.

In one embodiment, the present invention is a computing system having an apparatus for providing an inline data conversion processor. The inline data conversion processor receives an incoming data stream and a packer stream address (PSA) and generates an outgoing data stream. The inline data conversion processor includes a host processor interface for connecting the apparatus to a host processing unit within the computing system, a network interface for connecting the apparatus to a communications network within the computing system, a peripheral interface for connecting the apparatus to a peripheral device within the computing system, a stream decode module for decoding a first portion of the PSA to generate a transformation definition, an address generation module for decoding a second portion of the PSA to generate an outgoing data address associated with each data word of the outgoing data stream, and a data transform module for generating the outgoing data stream using the transformation definition.

In another embodiment, the present invention is a method for providing an inline data conversion processing upon a incoming data stream as part of a data transfer operation. The method receives a packer stream address (PSA) associated with a transformation performed upon the incoming data stream, decodes a first portion of the PSA to determine a transformation definition of the transformation performed upon the incoming data stream, generates a outgoing data address associated with each data word of an outgoing data stream from a second portion of the PSA, receives the incoming data stream from a data source, generates the outgoing data stream by applying the transformation definition to the incoming data stream, and transmits the outgoing data stream to a data destination.

In yet another embodiment, the present invention is a machine-readable medium having encoded thereon program code, that when the program code is executed by a host computing system, the host computing system implements a method for providing an inline data conversion processor. The method receives a packer stream address (PSA) associated with a transformation performed upon the incoming data stream, decodes a first portion of the PSA to determine a transformation definition of the transformation performed upon the incoming data stream, generates a outgoing data address associated with each data word of an outgoing data stream from a second portion of the PSA, receives the incoming data stream from a data source, generates the outgoing data stream by applying the transformation definition to the incoming data stream, and transmits the outgoing data stream to a data destination.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
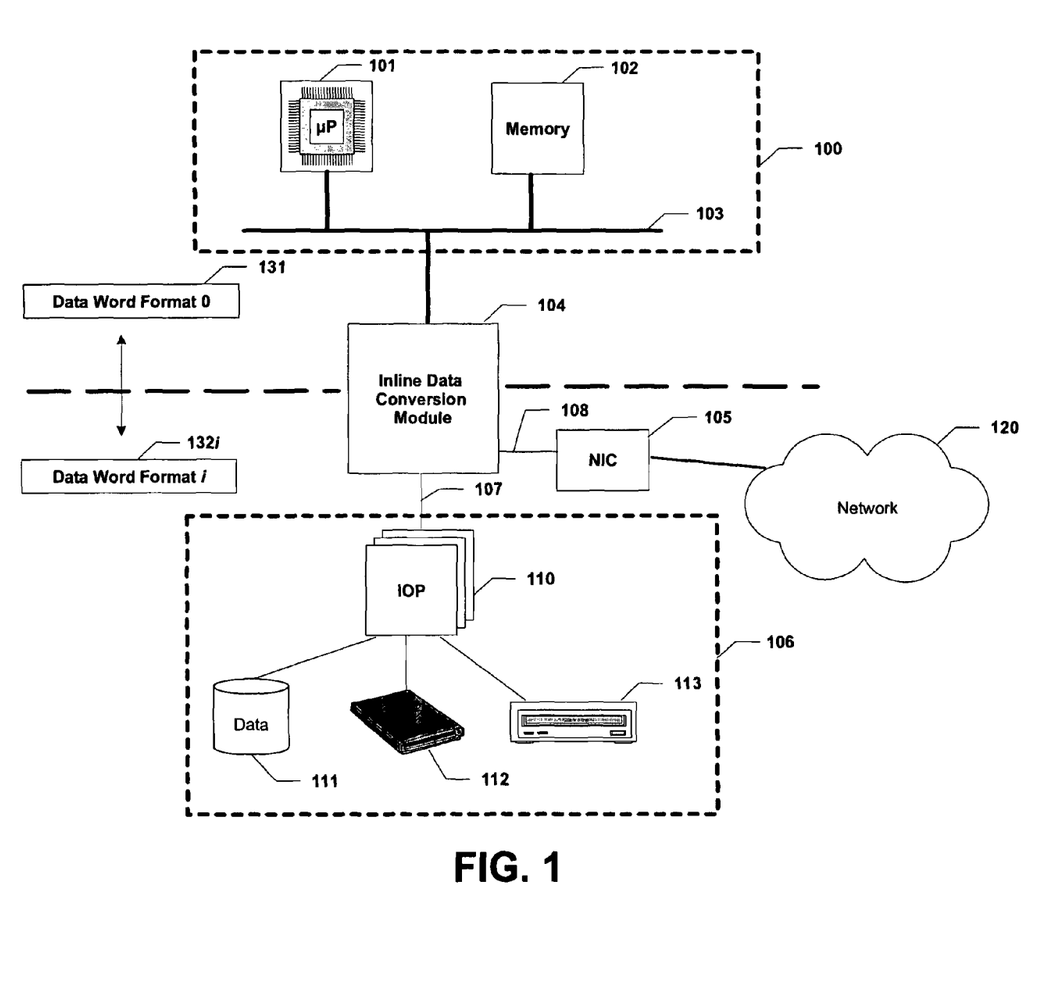
FIG. 1 illustrates an example multi-device based computing system according to an embodiment of the present invention.

FIG. 1 illustrates an example multi-device based computing system according to an embodiment of the present invention. The computing system consists of a processing module 100, a peripheral storage module 106, inline data conversion module 104, and a network interface connection (NIC) module 105 that connects the computing system to a communications network 120. The processing module 100, the peripheral storage module 106, and a network interface connection (NIC) module 105 are connected to the inline data conversion module 104 using processor bus 103, peripheral bus 107, and network bus 108, respectively.

Processing module 100 consists of at least one processor 101 and system memory 102. Processor 101 executes instructions to implement applications that process data within the system memory 102. The results of this processing is typically stored within system memory 102 for later transfer to the peripheral module 106 or NIC 105 for storage and/or use in other computing systems. Processing module 100 may possess multiple processors 101 that operate independently or together to process data stored within system memory 102.

Peripheral storage module 106 consists of one or more Input-Output Processor (IOP) modules 110 that support connections to peripheral devices such as hard drives 111, removable storage devices 112, and CD/DVD/CD-R drives 113. IOP module 110 send and receive data from the storage devices 111-113 that is transferred through the inline data conversion module 104 to system memory 102. IOP module 110 provides any interface processing and data/control signals necessary to communicate with the variety of supported peripheral devices. While the embodiment of FIG. 1 illustrates the support for mass storage devices 111-113 as the peripheral devices, one of ordinary skill in the art will recognize that any peripheral device supported by a corresponding IOP module 110, such as scanners, imaging devices and other input/output devices, may be included within a computing system without departing from the spirit and scope of the present invention as recited within the attached claims.

Network interface connection (NIC) module 105 sends and receives data from remote computing systems attached to communications network 120 that is transferred through the inline data conversion module 104 to and from system memory 102. NIC module 105 provides any interface processing and data/control signals necessary to communicate with network 120 using a variety of supported communication protocols such as TCP, UDP and similar IP-based communications. NIC 105 may also provide any connection establishment, maintenance, and termination processing needed to support network 120 as well as message routing, error detection and recovery, and related connection overhead operations.

Inline data conversion module 104 acts as bridge between the devices attached to the peripheral bus 107 and network bus 108 with the processing module 100 attached to the processor bus 103. Data being transferred from a peripheral device 111-113 to memory 102 passes through the inline data conversion module 104 at the full bus transfer rate without storage or buffering within the module 104. As the data passes though the device 104, the data may also be transformed to alter its format from a particular data work format I 132$i$ to a data format O 131 used within the processing module 100. This data transformation and reformatting is performed upon each word of data as it passes though the inline data conversion module 104 at the full data transfer rate. The module 104 may reformat the data from a plurality of different peripheral data format I 132$i$ to the processing module's format O 131 when the data is moved into system memory. The module 104 reforms data results from processing within processing module 100 to the peripheral data format i132$i$ when data is moved from the processing module 100 for storage and later use. Module 104 may provide any number of reformatting operations needed to support attached peripheral devices and network protocols.

Figure 2:
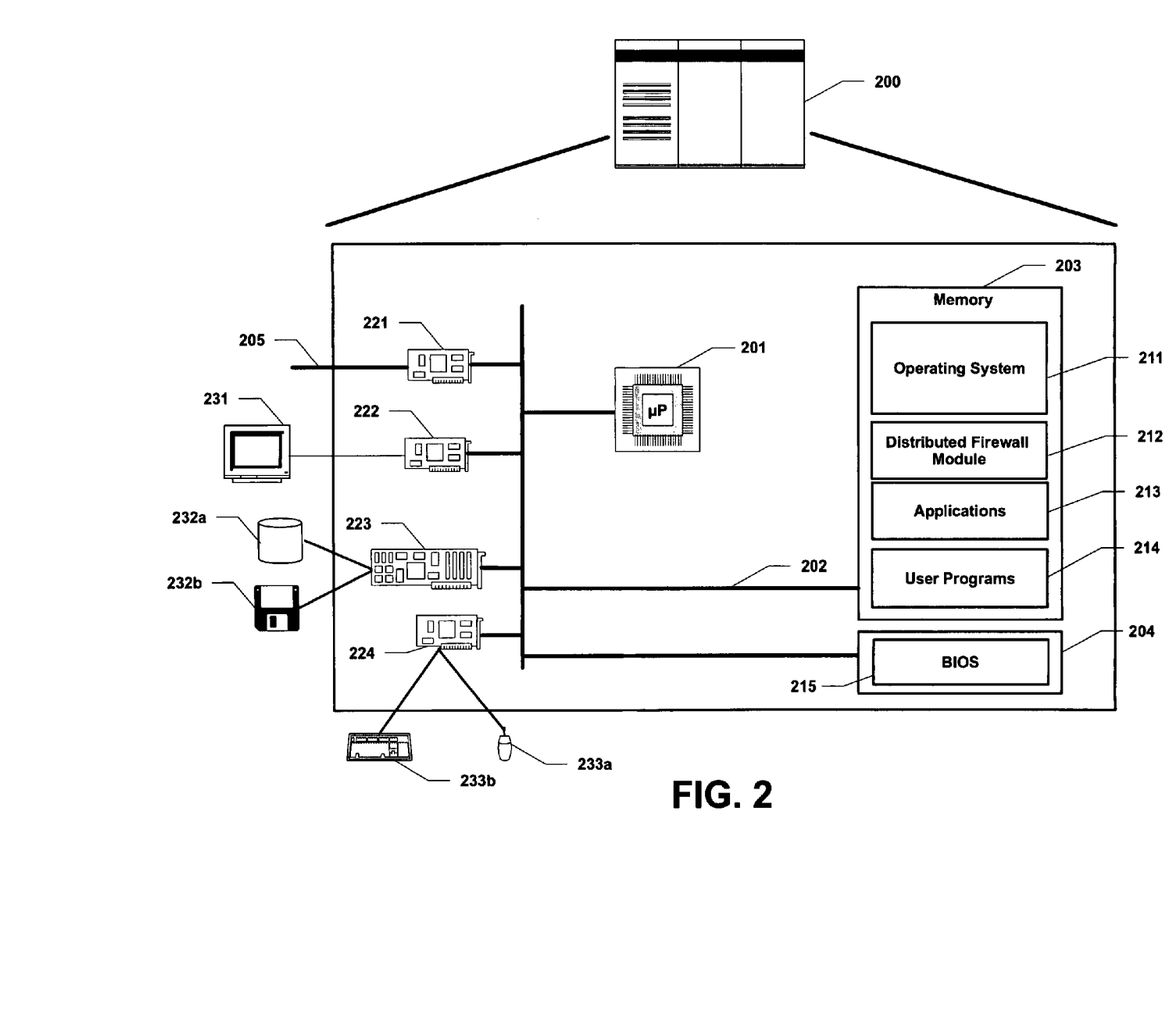
FIG. 2 illustrates a general purpose computing system for implementing various embodiments of the present invention.

FIG. 2 illustrates a general purpose computing system for implementing various embodiments of the present invention. Those of ordinary skill in the art will appreciate that the computing system 200 may include many more components than those shown in FIG. 2. However, the components shown are sufficient to disclose an illustrative embodiment for practicing the present invention. As shown in FIG. 2, computing system 200 is connected to WAN/LAN 120 (not shown), or other communications network, via network interface unit 221. Those of ordinary skill in the art will appreciate that network interface unit 221 includes the necessary circuitry for connecting computing system 101 to WAN/LAN 120, and is constructed for use with various communication protocols including the TCP/IP protocol. Typically, network interface unit 221 is a card contained within computing system 101.

The computing system 200 also includes processing unit 201, video display adapter 222, and a mass memory, all connected via bus 202. The mass memory generally includes RAM 203, ROM 204, and one or more permanent mass storage devices, such as hard disk drive 232$a$, a tape drive, CD-ROM/DVD-ROM drive, and/or a floppy disk drive 232$b$. The mass memory stores operating system 211 for controlling the operation of the programmable computing system 101. It will be appreciated that this component may comprise a general purpose server operating system as is known to those of ordinary skill in the art, such as UNIX, MAC OS X™, LINUX™, or Microsoft WINDOWS XP™. Basic input/output system ("BIOS") 215 is also provided for controlling the low-level operation of computing system 101.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a host computing system. More specifically, the mass memory stores applications including host application program 213, user programs 214, and distributed firewall module 212.

The computing system 200 also comprises input/output interface 224 for communicating with external devices, such as a mouse 233$a$, keyboard 233$b$, scanner, or other input devices not shown in FIG. 2. Likewise, computing system 101 may further comprise additional mass storage facilities such as CD-ROM/DVD-ROM drive and hard disk drive 232$a$. Hard disk drive 232$a$ is utilized by computing system 101 to store, among other things, application programs, databases, and program data used by various application programs.

The embodiments of the invention described herein are implemented as logical operations in a general purpose computing system. The logical operations are implemented (1) as a sequence of computer implemented steps or program modules running on a computer system and (2) as interconnected logic or hardware modules running within the computing system. This implementation is a matter of choice dependent on the performance requirements of the computing system implementing the invention. Accordingly, the logical operations making up the embodiments of the invention described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Figure 3:
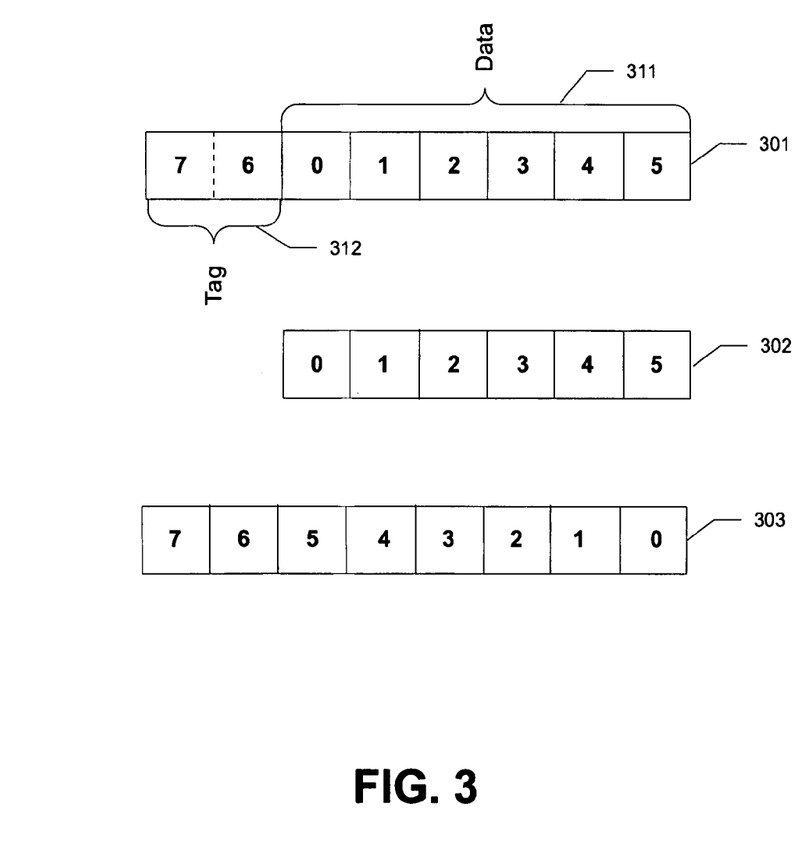
FIG. 3 illustrates example embodiments of data formats used within a computing system according to one embodiment of the present invention.

FIG. 3 illustrates example embodiments of data formats used within a computing system according to one embodiment of the present invention. A first data word format 301 illustrates a 48-bit data word 311 contained within an 8-byte word. Two bytes of tag data 312 are appended to the data word 311 to identify the type of data stored within the word 301. A second data word 302 contains a 48-bit data word stored within a six-byte word. In the second data word 302, all data bits are maintained and used as data only. A third data word 303 contains a 64-bit data word stored within an eight-byte word. In the third data word 303, all data bits are also maintained and used as data bits.

In addition to the different sizes for the data word portions of these three words 301-303 and in addition to the optional use of tag data within the first data word format 301, the order of the various bytes within each of the three data words may differ. In the first data word format 301 and the second data word format 302, the bytes of data are arranged in a little endian byte order. In contrast, the third data word format 303 arranges the bytes of data in a big endian byte order.

"Little Endian" byte order refers to a low-order byte of the number is stored in memory at the lowest address, and the high-order byte at the highest address. (The little end comes first.) For example, a 4 byte LongInt data structure:

Byte3 Byte2 Byte1 Byte0 will be arranged in memory as follows:

Base Address+0 Byte0
Base Address+1 Byte1
Base Address+2 Byte2
Base Address+3 Byte3

Processors manufactured by INTEL™ CORPORATION, such as the x86 and PENTUM™ processors, and the processors typically used in many personal computers use "Little Endian" byte order.

"Big Endian" means that the high-order byte of the number is stored in memory at the lowest address, and the low-order byte at the highest address. (The big end comes first.) Our LongInt, would then be stored as:

Base Address+0 Byte3
Base Address+1 Byte2
Base Address+2 Byte1
Base Address+3 Byte0

Processors manufactured by MOTOROLA™ CORPORATION, such as the 68000 family of processors, use "Big Endian" byte order.

Inline data conversion module 104 may be used to reform data words being transferred from a peripheral device 111 to system memory 102 from a Big Endian byte order format to a little Endian byte order format automatically. Inline data conversion module 104 may also add and/or delete tag bytes 312 when the data is converted to and from the first data word format 301 to the second data word format 302 and to the third data word format 303.

One skilled in the art will recognize that any number of other byte order arrangements may be used in place of either the Big Endian and the Little Endian byte orders used to describe a particular embodiment without departing from the spirit and scope of the present invention as recited within the attached claims.

Figure 4:
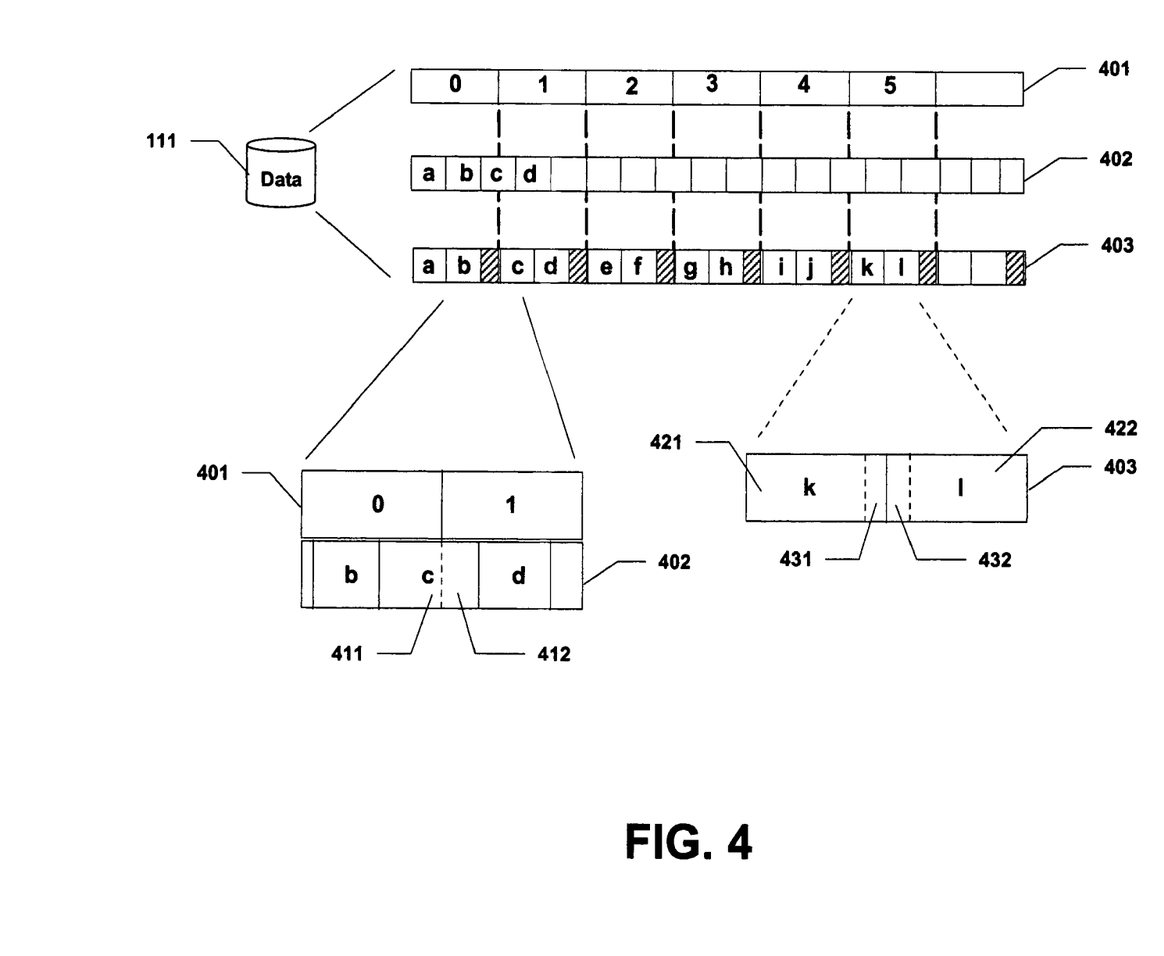
FIG. 4 illustrates example embodiments of data storage structures used within a computing system according to one embodiment of the present invention.

FIG. 4 illustrates example embodiments of data storage structures used within a computing system according to one embodiment of the present invention. Data stored on a disk 111 is typically stored in blocks of data that are stored in tracks and sectors on the physical disk. Different block sizes are used within various computing systems. These block sizes have also changed over time as the underlying physical disks 111 have evolved. When such changes have occurred over time, applications may expect to use a disk block size of a first size and the disk itself operating most efficiently at a second disk block size. Mapping the first block size onto the second block size, data formatting issued may need addressing by the inline data conversion module 104.

For example, applications may have been written expecting to access and store data using 180 byte blocks of data when the disk stores data in 512 or 1024 byte blocks. The use of 180 byte blocks was useful when data works consisted solely of 6-byte 48-bit words (i.e. 30 6-byte words are stored within 180 byte blocks). Recently, 8-byte 64-bit words are becoming more common. An even number of 8-byte words fix most efficiently within blocks of 512 or 1024 (i.e. blocks having a power of 2 number of bytes). When 180 byte of data that represent a block of data are stored within 512 byte physical blocks of data on a disk 111, the address for a particular byte of data is mapped from the 180-byte address space to the 512-byte block address space.

This mapping of data may be accomplished in many different manners. In a first example mapping, which may be identified as Virtual Sector Size 1 (VSS1), places each 180-byte block contiguously adjacent to each other across a continuous set of 512-byte blocks. A set of 512-byte block 401 are mapped to store a set of 180-byte blocks 402. Individual 512-byte blocks within the set of blocks 401 are identified as Block 0, Block 1 etc. Individual 180-byte blocks within the set of blocks 402 are identified as Block a, Block b etc. When such a mapping of three (3) 180 blocks of data, Blocks a-c, are mapped onto two (2) 512-byte blocks, Blocks 0-1, Blocks a-b fix completely within Block 0. A first portion of Block c 411 is also stored to fill Block 0. A second portion of Block c 412 that remains after the first portion of Block c is stored in Block 0 is subsequently stored in the first portion of Block 1. Additional 180-byte blocks, Block d,e etc., are stored in the remaining portions of Block 1. This process repeats itself as all of the 180-byte blocks 402 are mapped onto corresponding 512-byte blocks 401. All of the available bytes of storage in the set of 512-byte blocks 401 on disk 111 are used to store the set of 180-byte blocks of data 402. Unfortunately, addressing a particular byte of data within a randomly selected 180-byte block of data is not easily determined in the 512-byte blocks without knowing the exact number of blocks from the beginning of the set of blocks on the disk 11 is known.

In a second example mapping, which may be identified as Virtual Sector Size 2 (VSS2), places two (2) 180-byte block within each of the blocks of set of 512-byte blocks 401. In this example, Blocks k-1 within the set of 180-byte blocks 403 are mapped into Block 5 425 within the set of 512-byte blocks 401. Block k 321 and Block 1 422 require 360 bytes of data which completely fit within the 512-bytes of Block 5 425 with a set of 152 bytes of data 423 that are unused for storage. The less efficient use of available storage provides an easier mapping of bytes as all of the data within Block k 421 and Block 1 422 are located within Block 5 425 on the disk 111. Within this mapping, Blocks k 421 is considered an even block and Block 1 422 is considered an odd block as use of 8-byte words require a first part of a particular data byte 431 to be stored within block k 421 and a second part of the particular data byte 432 to be stored within Block 1 422. This arrangement occurs because 22.5 8-byte blocks fit within the 180 bytes of Blocks k-1 421-422.

Figure 5:
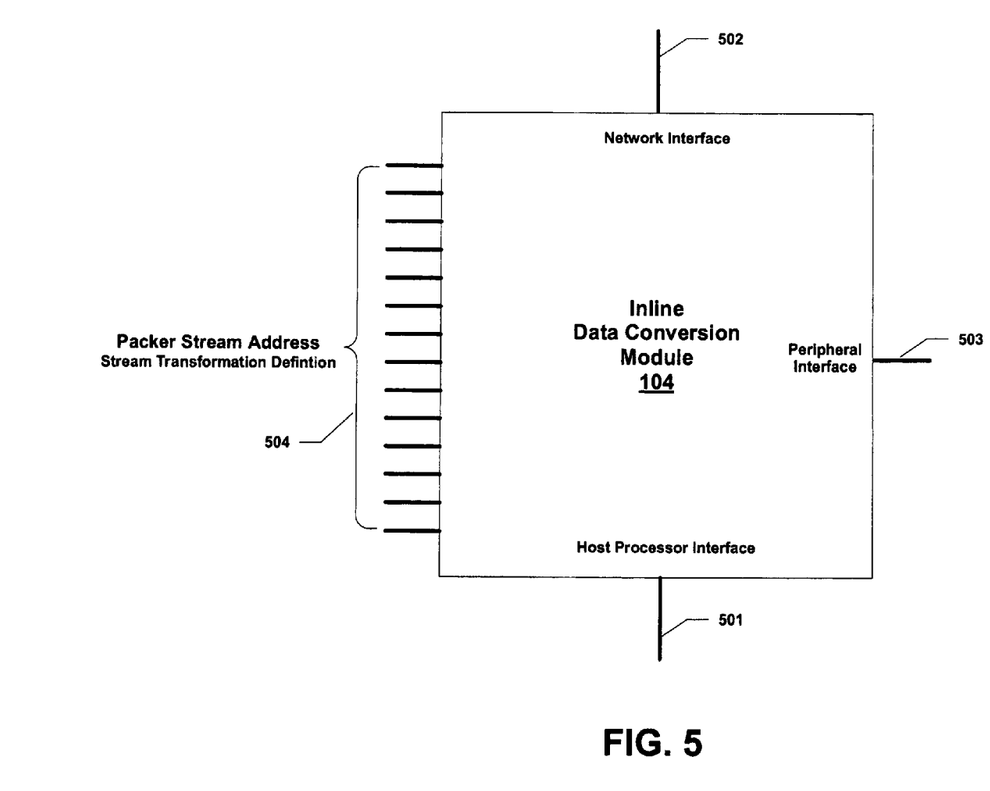
FIG. 5 illustrates an example embodiment of an inline data conversion module used within a computing system according to an embodiment of the present invention.

FIG. 5 illustrates an example embodiment of an inline data conversion module used within a computing system according to an embodiment of the present invention. Inline data conversion module 104 possesses a network interface 502 for connecting to network bus 108, a peripheral interface 503 for connecting to peripheral bus 107, and host processor interface 501 for interfacing to processor bus 103. Data transfers through inline data conversion module 104 use these interfaces as discussed above.

Inline data processor 104 also accepts a Packer Stream Address 504 that identifies the data re-formatting and transformation that is to be applied when data passes through the module 104. The inline data conversion module 104 may also be referred to as a "data packer" as blocks of data are packed into data streams transferred within a computing system.

Inline data conversion module 104 performs transfers via 'Packing Streams". Each packing stream is defined by a control word called a PSW. Fields within a PSW specify the transfer and VSS form to be used. Additionally, a PSW can define address translation to extend limited addressing capabilities of IOP devices and check-summing for networking per IETF RFC-793.

| | | |
|---|---|---|
| Stream Checksum | 63:48 | RFC-793 checksum |
| Internal Stream | 47 | HT or Internal PCI-X stream |
| Stream Base | 46:12 | base address - allows alignment to host addresses that are 4096 byte aligned |
| Stream Status | 11:10 | bit 10 - Master Data Parity Error<br>bit 11 - Target Data Parity Error |
| Stream Control | 9:8 | bit 8 - disable master Data Parity propagation and master assertion of PERR#<br>bit 9 - disable target Data Parity and target assertion of PERR# |
| Stream Command | 7:6 | (PSC) |
| Stream Edge | 5:0 | (PSE) |

Inline data conversion module Commands & Edges are what define re-formatting operation.

| input Transfer | output Transfer | PSC | PSE |
|---|---|---|---|
| Transfer Tags Odd | Transfer Tags Odd | 3 | 0-44 |
| reserved | reserved | 3 | 45-59 |
| Transfer Tags Odd | Transfer Tags Odd | 3 | 60 |
| reserved | reserved | 3 | 61-62 |

-continued

| input Transfer | output Transfer | PSC | PSE |
|---|---|---|---|
| Discard Data | Transfer Zeros | 3 | 63 |
| Transfer Tags Even | Transfer Tags Even | 2 | 0-44 |
| reserved | reserved | 2 | 45-59 |
| Transfer Tags Even | Transfer Tags Even | 2 | 60 |
| reserved | reserved | 2 | 61-62 |
| Untagged Transfer | Untagged Transfer | 2 | 63 |
| Force Data Tags | Strip Tags | 1 | 0-60 |
| reserved | reserved | 1 | 61-63 |
| Force Program Tags | reserved | 0 | 0-60 |
| reserved | reserved | 0 | 61-63 |

The Force commands set a 16 bit tag on each 6 byte word written. Even if only a part of the 6 byte word is written, the tag is set for the word. Forcing data tags sets a 0x0000, and forcing program tags sets 0x0003. Each resulting 8 byte word is byte swapped.

Transfer Tags commands sets the tag from the data stream, but applies a byte swap to each 8 byte word.

Transfer Zeros supplies a constant zero to all fetch requests; Discard Data accepts write transactions, but does not forward the transactions.

Edge values less than 60 define VSS2 packing; otherwise it's non-VSS2.

Inline data conversion module Architecture allows for $2^{23}$ streams, but the actual number is implementation dependent.

A Packer Stream Address, PSA, is the address in a Inline data conversion module internal interface (HT and internal PCI-X) transaction. It has two forms.

The VSS2 form is—

| | | |
|---|---|---|
| reserved | 63:45 | |
| Stream Index | 44:21 | Xfer Control Word index |
| Xfer Block | 20:9 | host memory block |
| Xfer Word | 8:3 | block word offset |
| reserved | 2:0 | used in PCI-X |

And the non-VSS2 form is—

| | | |
|---|---|---|
| reserved | 63:45 | |
| Stream Index | 44:21 | Xfer Control Word index |
| Xfer Offset | 20:3 | byte offset (could be in terms of 6 or 8) |
| reserved | 2:0 | used in PCI-X |

Stream Index is used to locate the appropriate PSW for this stream. The remainder of the PSA specifies the stream offset.

Stream Index 0 references a hardwired PSW that is used to access the Inline data conversion module SRAM and control registers. The PSC and PSE of this PSW specify and Untagged transfer.

For use on particular embodiment of the inline data conversion module 104, bit 39 goes out on the HT bus when one device is using the HT Device expansion space. In order to make the most efficient use of address space of the BCM1250 the following is a requirement for the Inline data conversion module 104 in this particular embodiment.

Use of Bit 39 is as follows:

If bit 39, of the PSA received by the HT, is set to 1, the access is a Non-Stream Index 0. The remaining bits (38:21) will identify the Stream Index.

If bit 39, of the PSA received by the HT, is set to 0, the access is a Stream Index 0. The remaining bits (38:21) will be ignored in determining the access type.

This gives the firmware the ability to use 32 bit addressing when accessing PSWs and FPGA internal registers and allows DMA transfers to use 64 bit addressing (actually 40 bit addressing on HT).

The Inline data conversion module 104 supports external (Host) addresses from 0 to $2^{63}-1$. Only those defined by its BAR are claimed, others are ignored.

Figure 6:
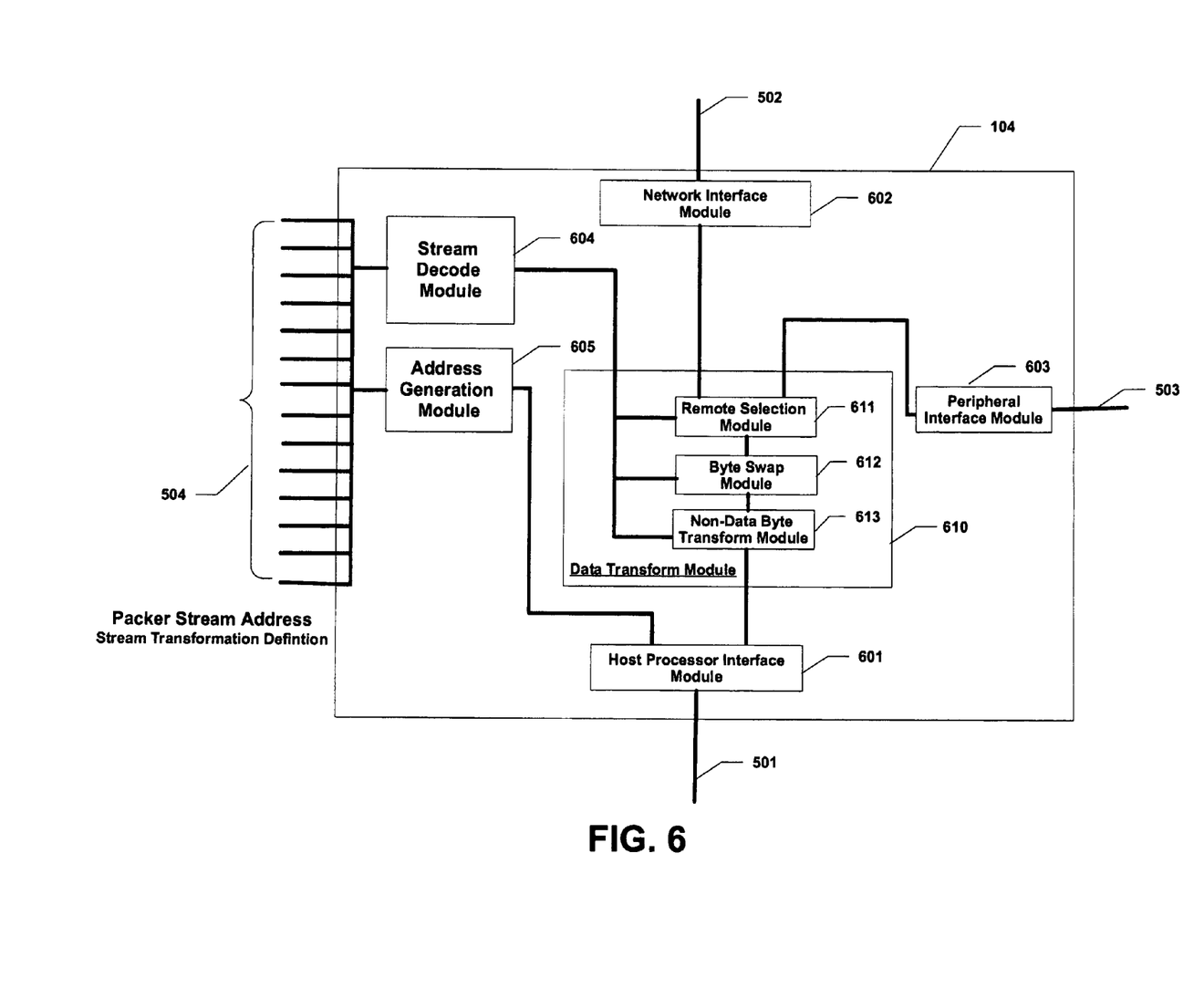
FIG. 6 illustrates a detailed example embodiment of the inline data conversion module of FIG. 5 according to an embodiment of the present invention.

FIG. 6 illustrates a detailed example embodiment of the inline data conversion module of FIG. 5 according to an embodiment of the present invention. Inline data conversion module 104 may be implemented using a host processor interface module 601 for providing data transfer signals and data buffering with the host processor interface 501 to processor bus 103. Inline data conversion module 104 may also include a peripheral interface module 603 for providing data transfer signals and data buffering with the peripheral interface 503 to processor bus 107. Inline data conversion module 104 may use a network interface module 602 for providing data transfer signals and data buffering with the network interface 502 to network bus 108.

Packer Stream Address 504 is passed through a stream decode module 604 and an address generation module 605 to select the data re-formatting and transformation that is to be applied when data passes through the module 104 and generate the memory address used when data is passed onto one of the busses 103, 107-108 in the computing system. Data transformation module 610 applies a data transformation to the data words as they pass between the host processor interface module 601 and either the peripheral interface module 603 and the network interface module 602. Data transform module 610 comprises a remote selection module 611, a byte swap module 612, and a non-data byte transform module 613 to perform the transformations defined by the Packer Stream Address. Remote selection module 611 selects between the network interface 502 and the peripheral module 503 for use in a particular data transfer. The remote selection module 611 multiplexes data between these interfaces depending upon which data stream is processed. The byte swap module 612 transforms the arrangement of data bytes within the data work. Byte swap module 612, for example may be used to transform a data word from a Big Endian byte order to a Little Endian byte order. The non-data byte transform module 613 may be used to add or delete tag bytes 312 to six (6)-byte data words 301-302. Other transformation modules may also be included within data transform module 610 as needed to complete a desired re-formatting operation without deviating from the spirit and scope of the present invention as recited within the attached claims.

The Host Config Space of the Host Target is the low 256 bytes of the SRAM address space. Some portions may be implemented as registers; the rest are actual SRAM locations.

The initial values for the Config registers are as follows:

| | |
|---|---|
| DeviceID | 0xC0B0 |
| VendorID | 0x1018 |
| SubsystemID | 0xC0B0 |
| SubSystem Vendor ID | 0x1018 |
| ClassCode | 0x020000 (Network, Ethernet Controller) |
| Revision ID | lowest 8 bits of FPGA binary version |

Config Registers are as defined by the PCI/PCI-X specifications. DeviceID, VendorID, ClassCode, RevisionID, SubsystemID, and SubsystemVendorID are read-only from the Host interface.

Host Config Space appears in the Inline data conversion module Control registers, too. There it is accessible from the HT interface. DeviceID, VendorID, ClassCode, RevisionID, SubsystemID, and SubsystemVendorID are writeable from the HT interface.

A Host Reset logic circuit is triggered through the Extended Configuration space. Host directed IOP Reset is defined as bit 5 of the Configuration Register 0x40. The host can set this bit to initiate a reset on the board that this Inline data conversion module 104 resides. The setting of this bit will initiate a signal to the CPLD using pin/signal CPLD-_INTF[1] of the interface signals. The bit will clear itself in a few clock cycles.

On its external PCI-X interface the Inline data conversion module 104 appears as a simple Master Mode DMA PCI-X device with a single 64-bit BAR. Only Host Data Cycles which fall within the BAR range are claimed by the Inline data conversion module Host Target.

The Host Target is a 32 bit target and only supports 32 bit transactions. It implements a 64 bit BAR at the first BAR location and a BIOS Expansion BAR.

In FIB Mode (CPLD FIB Jumper is installed), BAR 0 is 16 MB in size and is remapped to 0x1fxxxxxx. It functions as a direct 32-bit pass-through to Hyper-Transport (HT). Only 32 bits at a time are passed to HT. No packing is ever performed.

Writes up to 32 bits are accepted and posted to HT. If the host attempts to transfer more in a single 32 bit DWord, it is disconnected.

On reads, 32 bits are always requested from HT and returned to the host regardless of any byte enable settings.

In non-FIB mode, the BAR size is define by a BAR Mask register, but only offsets in the range 0x1c000 thru 0x1ffff are passed through to the HT interface. These are remapped to 0—for example, 0x8001c000 remaps to 0x0001c000. This range is used for an IOP Dump and other low-level protocols which is not defined in the document.

Reads in other ranges return the value 0xffffffff except for offsets 0x40 and 0x44. 0x40 and 0x44 return the contents of an associated register. Once read, the register (0x40 or 0x44) is set to 0xffffffff.

Non-FIB target writes outside the range 0x1c000 thru 0x1ffff are more complex. They have the claimed offset appended and are then posted to the HT interface in a FIFO fashion using either the Primary FIFO registers or the Priority FIFO registers.

| | | |
|---|---|---|
| BAR Offset | 63:32 | Address offset of the PCI/PCI-x write |
| Dword | 31:0 | DWord written |

Target writes to a 4096 modulus of 0x40 are posted using the Primary FIFO. Writes to any other location are written using the Priority FIFO. A full FIFO causes writes to be retried.

When enabled, the Expansion ROM BAR allows host BIOS access to the Flash memory on the target IOP. The size of this BAR is limited to 1 MByte. It is remapped to 0x1F0xxxxx similar to BAR 0 in FIB mode and functions as a direct 32-bit pass-through to Hyper-Transport (HT) with no packing.

Even thought the Host Target is only a 32 bit target, the Host Master is a full 64 bit target. It attempts to perform transactions in 64 bit mode and only reverts to 32 bit mode if the Host slot is 32 bits.

The Host Master always does cache aligned Write Combining and some Write Collapsing. For PCI-X this means that it accumulates posted data attempting to build an aligned 128 byte block. For PCI it attempts to accumulate blocks of cache-line size multiples and uses Memory Write Invalidates.

It is very likely that incoming Host Master transactions will break on non-Quad-word boundaries. This will result in the last Quad-word address of the prior transaction being the same as the first Quad-word of a transaction that needs to combined. In this case the byte lanes of the two Quad-words are merged and a single Host Master transaction formed.

Due to tag insertion, it is also likely the tag byte lanes will be valid in both Quad-words. This does not stop the merging. Rather, tag lanes from either Quad-word may be selected for the merge.

Writes that cannot be combined force a transaction to deliver the preceding posted data. In no case is the order of posted data changed. A timer also forces a transaction to be delivered when no subsequent transaction triggers delivery after 1 microsecond.

Reads that originate from the internal PCI-X bus and HT DMAs pass along the block count to the Host PCI-X interface unless it is too large to be internally buffered, in which case the amount that can be buffered is requested. Actual HT reads also pass along the amount requested, but are limited to 64 bytes by HT. (The BCM 1250 Z-Bus further limits reads to 32 bytes.)

When operating in PCI mode, the Host Master accepts as much as the Host delivers in the transaction which will typically be 512 bytes.

The address of a non-Host Data Cycle transfer is not a true address, but rather a Packer Stream Addresses, PSA, described earlier.

The Stream Index field is first isolated and used to obtain the appropriate PSW. The Stream Command and Stream Edge define the how the data transferred will be processed by the Inline data conversion module 104.

The output quad-word address for the data is calculated one of five ways depending on the stream command. The quad word address is not the byte address but an address that represents 8 bytes.

In non-VSS2 Force/Strip tags mode—Quad-word
address=(Stream Base*512)+(*Xfer* Offset*8/6)

In VSS2 Force/Strip tags mode—Quad-word address=
(Stream Base*512)+*Xfer* Block*60+*Xfer*
Word*8/6+Stream Edge In VSS2 Transfer Tags Even and Odd mode—Quad-word address=(Stream Base*512)+*Xfer*
Block*45+*Xfer* Word+Stream Edge In all other cases—Quad-word address=(Stream
Base*512)+*Xfer* Offset The calculated quad-word address is used by a Inline data conversion module Master for its fetch or store.

Inline data conversion module Control Registers and SRAM are only accessible from HT and internal PCI-X interfaces. They are selected by the hardwired stream index of 0. Control Registers and SRAM share a common address space so control registers make corresponding locations in SRAM inaccessible.

Inline data conversion module Control Registers are the basic control interface for the Inline data conversion module 104. Partial writes are allowed and must be supported.

| Register Name | SRAM Offset | Field Name | Bits | Comment |
|---|---|---|---|---|
| Host Config | 0 – 0xf8 | | | PCI/PCI-X Config Space |
| Status/Control | 0x100 | BAR Size Mask | 63:17 | 1 => bit in BAR can be set |
| | | reserved | 16 | |
| | | 0x44 Assert | 15 | 0x44 Register == 0xffffffff |
| | | 0x40 Assert | 14 | 0x40 Register == 0xffffffff |
| | | Priority FIFO Assert | 13 | Priority Head ! = Tail |
| | | Primary FIFO Assert | 12 | Primary Head ! = Tail |
| | | reserved | 11 | |
| | | Iop Int Enable | 10 | Iop interrupt assertion |
| | | Host Int Enable | 9 | IntA# assertion |
| | | Retry Disable | 8 | |
| | | SERR Assert Int En | 7 | SERR asserted to Host |
| | | SERR Detect Int En | 6 | SERR detected |
| | | PERR Assert Int En | 5 | PERR asserted to Host |
| | | PERR Detect Int En | 4 | PERR detected |
| | | 0x44 Int Enable | 3 | 0x44 Register == 0xffffffff |
| | | 0x40 Int Enable | 2 | 0x40 Register == 0xffffffff |
| | | Priority FIFO Int En | 1 | Priority Head ! = Tail |
| | | Primary FIFO Int En | 0 | Primary Head ! = Tail |
| Host Read | 0x108 | 0x44 Register | 63:32 | Host read sets 0xffffffff |
| | | 0x40 Register | 31:0 | Host read sets 0xffffffff |
| Primary FIFO | 0x110 | FIFO Base | 63:48 | in 64K units |
| | | FIFO Last | 47:32 | last index |
| | | FIFO Head | 31:16 | index of head |
| | | FIFO Tail | 15:0 | index of tail |
| Priority FIFO | 0x118 | FIFO Base | 63:48 | in 64K units |
| | | FIFO Last | 47:32 | last index |
| | | FIFO Head | 31:16 | index of head |
| | | FIFO Tail | 15:0 | index of tail |
| HT DMA 0,0 | 0x120 | Status | 63:60 | != 0 complete |
| | | Control | 59:56 | xxx1 => interrupt enable |
| | | | | xx1x => fetch next on good |

-continued

| Register Name | SRAM Offset | Field Name | Bits | Comment |
|---|---|---|---|---|
| | | Link | 55:32 | complete next in SRAM |
| | | Destination Address | 31:0 | |
| HT DMA 0,1 | 0x128 | Length | 63:45 | |
| | | Source Address | 44:0 | |
| HT DMA 1,0 | 0x130 | Status | 63:60 | != 0 complete |
| | | Control | 59:56 | xxx1 => interrupt enable<br>xx1x => fetch next on good complete |
| | | Link | 55:32 | next in SRAM |
| | | Destination Address | 31:0 | |
| HT DMA 1,1 | 0x138 | Length | 63:45 | |
| | | Source Address | 44:0 | |
| CONFIG | 0x140 | Config Address | 63:32 | PCI Config Cycle address |
| | | Config Data | 31:0 | Config Space data |
| Error Int/Status | 0x148 | reserved | 63:61 | Error Interrupt/Status |
| | | SRAM Parity Error Interrupt Enable | 60 | Write a value of 1 to enable SRAM Parity Error interrupt |
| | | reserved | 59:33 | |
| | | SRAM Parity Error Assert | 32 | Read value of 1 says a SRAM parity error occurred. Write a value of 1 to clear latched condition. |
| | | reserved | 31:5 | |
| | | SRAM Parity Error Int | 4 | Read a value of 1 says this condition is generating an interrupt. |
| | | SERR Int Assert | 3 | Read value of 1 says this condition occurred Write a value of 1 to clear condition. |
| | | SERR Int Detected | 2 | |
| | | PERR Int Assert | 1 | |
| | | PERR Int Detected | 0 | |
| FPGA Revision | 0x150 | reserved | 63:32 | |
| | | Logic Family | 31:24 | 0 = Xilinx XDS<br>1 = Unisys Golden Gate |
| | | Host I/F Mode | 23:16 | 0 = PCI<br>1 = PCI-X |
| | | Revision | 15:0 | Bitstream Revision |

Note—Indexes are Indexes, not Offsets

The Inline data conversion module Status/Control Register contains the mask for the Host BAR, the Config Retry Disable bit, and various interrupt enables. Except for Host Int Enable, interrupt enables refer to Iop interrupt(s).

The host interrupt, INTA#, is generated if the Host Int Enable bit is set and the 0x44 Register!=0xFFFFFFFF.

Iop interrupts are generated only if the Iop Int Enable bit is set and a bit is set in Inline data conversion module Control Register 7:0.

0x44 Register Assert [15:15] is set whenever the Host Read 0x44 register has a value of 0xFFFFFFFF.

0x40 Register Assert [14:14] is set whenever the Host Read 0x40 register has a value of 0xFFFFFFFF.

Priority FIFO Assert [13:13] is set whenever the Host Priority FIFO Head and Host Priority FIFO Tail are not equal.

Primary FIFO Assert [13:13] is set whenever the Host FIFO Primary Head and Host FIFO Primary Tail are not equal.

Host Read Registers actually are the head of an Iop implemented FIFOs for passing DWords to the Host from the Iop. Whenever a register is not equal to 0xffffffff and its enable bit and the Iop Int Enable bit are set, and an interrupt is generated to the Iop. Also, if register 0x44 is not equal to 0xffffffff and the Host Int Enable bit is set, INTA# is asserted to the Host.

Host Write FIFOs are not real hardware FIFOs, but describe areas of Iop memory that are written in a FIFO manner. Writes to offset 0x40 write to the Primary FIFO, all other writes write to the Priority FIFO.

Both the target offset, as well as the data written are written to the FIFO—

| | |
|---|---|
| Host Offset | 63:32 |
| Host Data | 31:0 |

The offset and data are written at the Head of the FIFO. The HT address is calculated by multiplying the FIFO Head index by 8 and adding it to the FIFO Base multiplied by 65,536. Software updates the FIFO Tail as it processes FIFO entries.

DMAs can be chained by building chains of control blocks in SRAM. DMA Control Blocks in SRAM have the same format as DMA registers.

A DMA operation is started by software setting the status field of a DMA Control Register to zero. If the Length field is non-zero, the current register values are used. As Length is decremented to zero and if no error has occurred, the Control field is examined to see if a DMA Control Block must be fetch and if so, it is fetched and the operation continued, perhaps with a new stream. Software may set the status to zero with Length zero and fetch set in the Control field. This will cause a DMA operation to begin with a load of a DMA Control Block specified in the Link field.

Inline data conversion module SRAM is primarily used to hold PSWs and DMA control blocks, but it may also contain debug traces, logs, etc. PSWs are located in lower locations with other structures above.

Software may place PCI Capabilities in SRAM that a Host may access through PCI Config Cycles.

All conventional error detection, handling, and reporting practices are followed. This includes implementation of SERR# Enable and Parity Error Response in the PCI Device's Configuration Command Register. Also, the Inline data conversion module 104 does not exercise the master option of not asserting PERR# on read data phase parity detection. It does assert PERR# if Parity Error Response is set.

Beyond the PCI requirements, all data paths and structures are parity protected. However, if a data parity occurs, it must not be corrected, but must be carried along and delivered to the ultimate data destination.

Parity errors on control paths and in control structures can not be pasted along and therefore assert SERR# providing SERR# Enable is set.

The Data FIFO and PCI Target interface present special challenges to this. The Data FIFO is not written as complete 80 bit word. Instead it is written as discrete 10 bit groups as specified by the group's byte enable bit. The simple way of handling this is to put parity on each individual group. But, if the data phase being written has a parity error, each 10 bit group must now have a forced parity error and any 10 bit group in error must force a parity error on any data cycle it becomes a part of. This ensures that even if the groups end up in different host data cycles, each data cycle will have a parity error forced on it.

The pragmatics of the byte-wise parity of the Data FIFO is that most all data paths carry byte-wise 10 bit parity. Parity is converted from the 32 bit Dword parity of PCI to 10 bit byte-wise parity early in the path and back late in the data path. Otherwise, additional parity checker/generators are required.

This policy of carrying parity errors through the Inline data conversion module 104 creates a problem for writes received on the PCI Target interface. Write receive parity (PAR and PAR64) one clock after the data cycle. This is to allow time for the generation of PAR and the generation of the check for PAR. But, this puts PAR behind the data cycle. So, PAR must be accelerated into its data cycle by the target as illustrated below.

The Inline data conversion module 104 deals with data as Quad-words. Except in the Barrel and Byte Swap units, quad-word byte lanes are preserved.

Host mastered cycles are never translated as Packer Streams, but all non-Host mastered Data Cycles are treated as Packer Streams and address translated. The quad-word portion of the address is translated as described above in Non-Host Data Cycles.

The Data FIFO is two banks 8 bytes wide each. Each byte is 10 bits wide making the structures 80 bits wide each. The two extra bits are to support byte-wise parity and a byte valid bit. The byte valid bit is to track a construct correct byte enables at Master.

One bank contains odd quad-words and the other even quad-words. Inputs and outputs to the banks are swapped for odd quad-word addresses, but both are always read/written.

The Data FIFO Quad-Word Address registers have a special increment function for force/strip tag commands and VSS2 mode. On force commands the FIFO QWA In register skips modulo 4=3 locations—e.g. 0, 1, 2, 4, 5, 6, 8, . . . . And, on strip commands the FIFO QWA Out registers increments this way.

In VSS2 mode the Quad-word Address is incremented from 512 modulo 180 to the next 512 byte boundary. On read type commands the FIFO QWA In register is incremented, and on write type commands the FIFO QWA Out register is incremented. In VSS2 versions of the Transfer Tags Odd/Even and Force Data/Program Tags operations, the Inline data conversion module Engine must handle the stripping/insertion of pad from/to data words that use Xfer Words of 45 through 63.

In force tags mode it is possible that the receiver could overrun the sender. The Data FIFO must be large enough to prevent this. In strip tags mode the reverse is true, the sender could outrun the receiver. The sender delays starting until 25% of the expected transaction size has been received.

Bytes are swapped within quad-words for all transfers except Untagged.

Byte alignment is simply a shift in a 16 byte wide barrel. The full 10 bit bytes are shifted.

The byte shift value is derived in one of four ways—

In non-VSS2 force/strip tags mode—Byte Shift=*Xfer Offset* % 6+2;

In VSS2 force/strip tags mode—Byte Shift=*Xfer Word* % 6+2;

In VSS2 transfer tags odd mode—Byte Shift=4;

In other modes—Byte Shift=0;

The Left shifting Barrel is used for force tags and the Right shifting Barrel is used for strip tags.

For the Left Barrel, the upper 8 bytes initially enter with byte enables de-asserted and the lower 8 from the data cycle. Byte enables fill with de-assertions. In the Left Barrel, byte 7 is connected to byte 10 and byte enable 7 connected to byte enable 10 during the shift; otherwise the shift is normal, and the Right Barrel is reversed. The barrel shifts by Byte Shift defined above. Invalid bytes are not written to the addressed even or odd bank, but are written to the other bank.

The Left Barrel also sets the proper tag value on force tag operations. Bytes 0, 1, 8, and 9 are set to valid zeros on Force Data Tag operations. Bytes 0 and 9 are set to 3 and 1 and 9 set to 0 on Force Program operations.

A checksum is kept for Packer Stream data. For read type transaction it is accumulated on the input to the destination MUX. For write type data it is accumulated at the source MUX.

A single Host Interrupt Pin is to notify the host that the FPGA needs servicing by the host. The signal is asserted to the host if the 0x44 Register has a value that is not 0xFFFFFFFF and the Host Interrupt Enable (bit 9) is set in the Inline data conversion module Status/Control Register is set to 1. This interrupt is asserted LOW active to conform to the INTA# of PCI/PCI-X.

Host Int Pin=(0x44_Reg!=0x*FFFFFFFF*) && (Host_int_Enable=1)

There are 22 signals between the FPGA and to the CPLD. These are defined in the CPLD Requirement specification but are listed here for completeness.

| Signal Name | Direction | Active State | Purpose |
| --- | --- | --- | --- |
| CPLD_INTF[0] | FPGA <- CPLD | High | FIB Mode notification from CPLD |
| CPLD_INTF[1] | FPGA -> CPLD | High | FPGA IOP Reset |
| CPLD_INTF[2] | FPGA -> CPLD | High | FPGA Debug Signal |
| CPLD_INTF[3] | FPGA -> CPLD | High | FPGA Error Interrupt |
| CPLD_INTF[4] | FPGA -> CPLD | High | FPGA IOP Primary FIFO Interrupt |
| CPLD_INTF[5] | FPGA -> CPLD | High | FPGA IOP Priority FIFO Interrupt |
| CPLD_INTF[6] | FPGA -> CPLD | High | FPGA IOP Read Reg 0x40 Interrupt |
| CPLD_INTF[7] | FPGA -> CPLD | High | FPGA IOP Read Reg 0x44 Interrupt |
| CPLD_INTF[8] | FPGA -> CPLD | High | FPGA HT DMA 0 Interrupt |
| CPLD_INTF[9] | FPGA -> CPLD | High | FPGA HT DMA 1 Interrupt |
| CPLD_INTF[10] | PCI Debug -> FPGA | Low | PRSNT1# signal from PCI debug connector |
| CPLD_INTF[11] | PCI Debug -> FPGA | Low | PRSNT2# signal from PCI debug connector |
| CPLD_INTF[12] | FPGA -> CPLD | High | FPGA signal to CPLD that a PCI/PCI-X reset has been detected |
| CPLD_INTF[13:17] | FPGA - CPLD | undefined | Unused signals for future implementation |
| DCM_HT1_LOCK | FPGA-> CPLD | High | FPGA DCM Locked for HT1 |
| DCM_HT2_LOCK | FPGA-> CPLD | High | FPGA DCM Locked for HT2 |
| DCM_PCIX_LOCK | FPGA-> CPLD | High | FPGA DCM Locked for PCI/PCIX |
| DCM_SRAM_LOCK | FPGA-> CPLD | High | FPGA DCM Locked for SRAM |
| FPGA_RESET_L | FPGA<- CPLD | Low | Signal from CPLD to reset the FPGA |

There are 9 signals/pins out of the FPGA used to signal the board about state within the FPGA. These signals are routed to the CPLD a particular platform and most are then routed to General Purpose I/O and Interrupt pins on the BCM1250. All signals are level sensitive and are asserted with a high active value.

Derived from bit 16 of the Configuration Register 0x40. The host can write this bit to induce a reset on the IOP. This signal does not get routed to a GPIO pin of the BCM1250.

An available signal from the FPGA implementation to signal the IOP processor to take some action. Used for debug.

The FPGA Error Interrupt signal is generated when any of the following OR'ed collection of error interrupts is detected by the FPGA. These include:
SRAM Parity Error
SERR Interrupt Assert
SERR Interrupt Detected
PERR Interrupt Asserted
PERR Interrupt Detected
See the description of the Error Interrupt Control/Status register.

The FPGA IOP Primary FIFO Interrupt signal is sent to the CPLD to interrupt the IOP processor for the following condition:

If the Primary FIFO Int Enable is set to 1 AND the Host Primary Fifo Head!=Host Primary Fifo Tail.

FPGA IOP Primary FIFO Interrupt=Primary FIFO Int Enable && (Host Primary Fifo Head!=Host Primary Fifo Tail).

The FPGA IOP Priority FIFO Interrupt signal is sent to the CPLD to interrupt the IOP processor for the following condition:

If the Priority FIFO Int Enable is set to 1 AND the Host Priority Fifo Head!=Host Priority Fifo Tail.

FPGA IOP Priority FIFO Interrupt=Priority FIFO Int Enable && (Host Priority Fifo Head!=Host Priority Fifo Tail).

The FPGA IOP Read Reg 0x40 Interrupt signal is sent to the CPLD to interrupt the IOP processor for the following condition:

If the 0x40 Register Int Enable is set and Host Read Register 0x40 has a value equal to 0xFFFFFFFF.

FPGA IOP Read Reg 0x40 Interrupt=0x40 Register Int Enable && (Host Read Reg 0x40=0x$FFFFFFFF$)

The FPGA IOP Read Reg 0x44 Interrupt signal is sent to the CPLD to interrupt the IOP processor for the following condition:

If the 0x44 Register Int Enable is set and Host Read Register 0x44 has a value equal to 0xFFFFFFFF.

FPGA IOP Read Reg 0x44 Interrupt=0x44 Register Int Enable && (Host Read Reg 0x44=0x$FFFFFFFF$).

The FPGA HT DMA 0 Interrupt signal is sent to the CPLD to interrupt the IOP processor for the following condition:
If the HT DMA 0 Status bits (63:60) are non-zero AND the HT DMA 0 Control bit 56 is set.

FPGA HT DMA 0 Interrupt=(HT DMA 0 Status(63:60)!=0) && (HT DMA 0 Control(56)=1).

The FPGA HT DMA 1 Interrupt signal is sent to the CPLD to interrupt the IOP processor for the following condition:
If the HT DMA 1 Status bits (63:60) are non-zero AND the HT DMA 1 Control bit 56 is set.

FPGA HT DMA 1 Interrupt=(HT DMA 1 Status(63:60)!=0) && (HT DMA 1 Control(56)=1).

Figure 7:
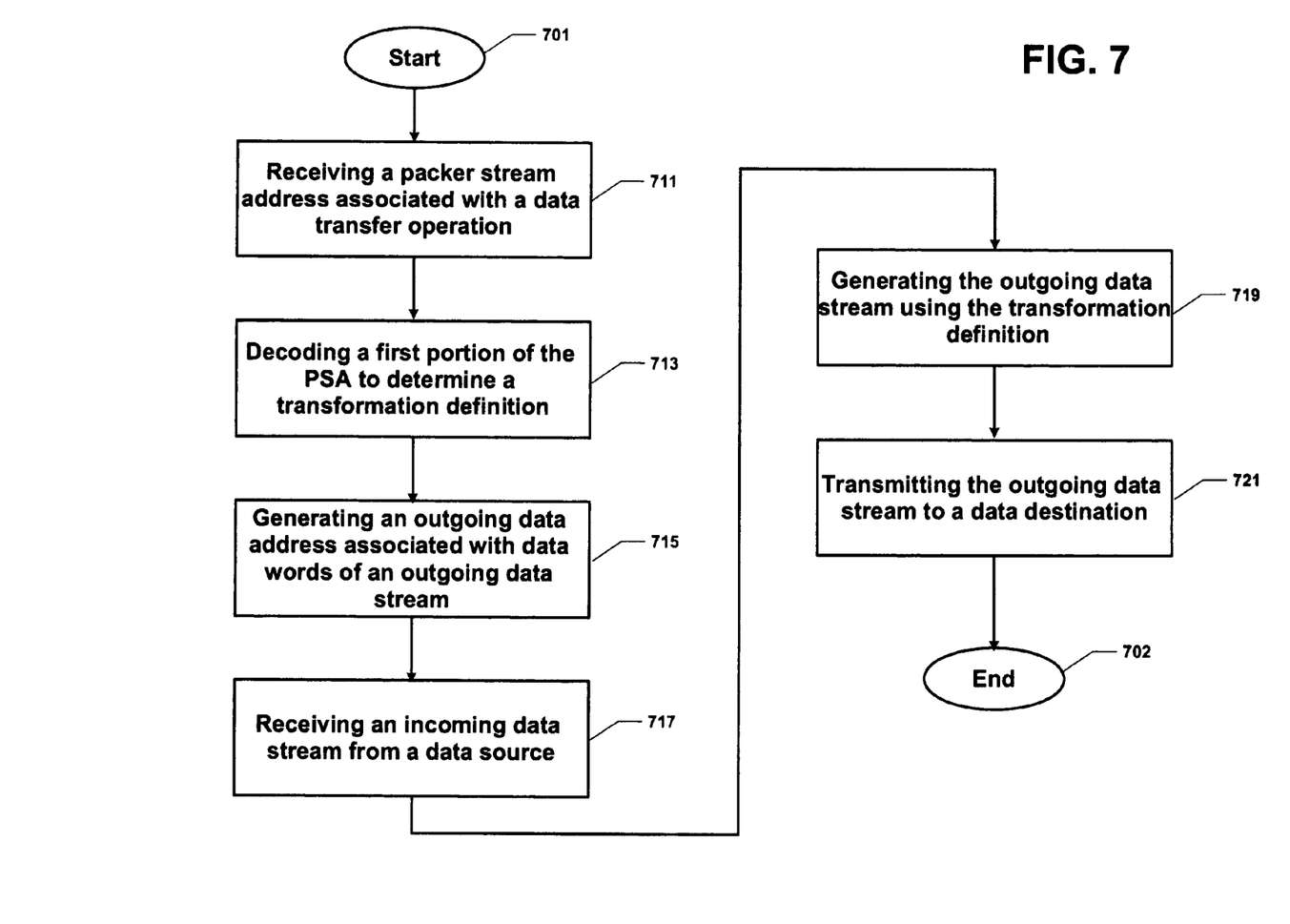
FIG. 7 illustrates an example embodiment of a flowchart for a sequence of operations performed to implement an embodiment of the present invention.

FIG. 7 illustrates an example embodiment of a flowchart for a sequence of operations performed to implement an embodiment of the present invention. The processing begins 701 when an inline data conversion processor receives a packer stream address (PSA) used to define the nature of the data transformation to be performed to a data stream being transferred from a data source to a data destination in operation 711. The data source and the data destination may include digital processing and storage devices connected to the inline data transform processor using a host processor interface, a peripheral interface and a network interface.

The PSA has at least two portions. A first portion of the PSA is decoded in operation 713 to determine a transformation definition. The transformation definition specifies the functions that are applied to the data words that are part of an incoming data stream when generating an outgoing data stream. A second portion of the PSA is used to generate an outgoing data address for each word of the outgoing data stream in operation 715. As noted above in reference to FIG. 5, data may be stored into 512-byte data blocks in multiple storage formats, i.e. VSS1 and VSS2. The outgoing data address corresponds to the address within these data block formats when the block of data is received at the data destination. As such, devices attached to each if the plurality of interfaces may transmit and receive data in its respective data block format where the inline data transform processor performs the appropriate addressing transformation.

In operation 717, a sequence of data words from within the incoming data stream is received by the inline data transform processor. This sequence of data words are typically part of a DMA data transfer operation that moves a data block from one data device to another data device. The outgoing data stream is generated in operation 719 by applying the transformation definition to each data word of the incoming data stream as the data words pass through the inline data transform processor.

Once the data words of the outgoing data stream are generated, the inline data transform processor transmits the data words to the data destination in operation 721. This process of operations is performed upon each data word within the incoming data stream to generate a corresponding set of outgoing data words in the outgoing data stream. The processing ends 702 when the entire set of outgoing data words are generated and transmitted to the data destination.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. An apparatus for providing an inline data conversion processor to a computing system to receive an incoming data stream and a packer stream address (PSA) and to generate an outgoing data stream, the apparatus comprising:
   a host processor interface for connecting the apparatus to a host processing unit within the computing system;
   a network interface for connecting the apparatus to a communications network within the computing system;
   a peripheral interface for connecting the apparatus to a peripheral device within the computing system;
   a stream decode module for decoding a first portion of the PSA to generate a transformation definition;
   an address generation module for decoding a second portion of the PSA to generate an outgoing data address associated with each data word of the outgoing data stream; and
   a data transform module for generating the outgoing data stream from the incoming data stream using the transformation definition.

2. The apparatus according to claim 1, wherein the transformation definition comprises a byte swap definition corresponding to transforming the incoming data stream to the outgoing data stream by switching the byte order between a big endian byte order and a little endian byte order.

3. The apparatus according to claim 2, wherein the transformation definition further comprises a remote selection definition corresponding to selecting between the plurality of data input interfaces for use in generation of the output data stream.

4. The apparatus according to claim 3, wherein the transformation definition further comprises a non-data byte order transformation definition corresponding to a definition of a functional data transformation applied to the incoming data stream to generate the outgoing data stream.

5. The apparatus according to claim 1, wherein the outgoing data stream is generated by data transform module applying the transformation definition to each data word of the incoming data stream during successive data transfer cycles of a DMA data transfer operation.

6. The apparatus according to claim 1, wherein the plurality of data interfaces provide data correspond to a 180-byte data blocks defined by 30 six-byte, 48 bit data words.

7. The apparatus according to claim 6, wherein the 180-byte data blocks are stored within contiguous storage blocks within 512-byte data blocks.

8. The apparatus according to claim 6, wherein two 180-byte data blocks are stored within each storage blocks, the storage blocks correspond to 512-byte data blocks.

9. The apparatus according to claim 8, wherein the outgoing data address generated by the address generation module corresponds to storage addresses within the 180-byte data blocks.

10. A method for providing an inline data conversion processing upon an incoming data stream as part of a data transfer, the method comprising:
receiving a packer stream address (PSA) associated with a transformation performed upon the incoming data stream;
decoding a first portion of the PSA to determine a transformation definition of the transformation performed upon the incoming data stream;
generating an outgoing data address associated with each data word of an outgoing data stream from a second portion of the PSA;
receiving the incoming data stream from a data source;
generating the outgoing data stream by applying the transformation definition to the incoming data stream; and
transmitting the outgoing data stream to a data destination.

11. The method according to claim 10, wherein the data source comprises a digital data device attached to one of a plurality of data interfaces.

12. The method according to claim 11, wherein the data destination comprises a digital data device attached to one of the plurality of data interfaces.

13. The method according to claim 12, wherein the plurality of data interfaces comprises a host processor interface, a network interface, and a peripheral interface.

14. The method according to claim 11, wherein the transformation definition comprises a byte swap definition corresponding to transforming the incoming data stream to the outgoing data stream by switching the byte order between a big endian byte order and a little endian byte order.

15. The method according to claim 14, wherein the transformation definition further comprises a remote selection definition corresponding to selecting between the plurality of data input interfaces for use in generation of the output data stream.

16. The method according to claim 15, wherein the transformation definition further comprises a non-data byte order transformation definition corresponding to a definition of a functional data transformation applied to the incoming data stream to generate the outgoing data stream.

17. The method according to claim 10, wherein the outgoing data stream is generated by applying the transformation definition to the incoming data stream during successive data transfer cycles of a DMA data transfer operation.

18. The method according to claim 11, wherein the plurality of data interfaces provide data correspond to a 180-byte data blocks defined by 30 six-byte, 48 bit data words.

19. The method according to claim 18, wherein the 180-byte data blocks are stored within contiguous storage blocks within 512-byte data blocks.

20. The method according to claim 18, wherein two 180-byte data blocks are stored within each storage blocks, the storage blocks correspond to 512-byte data blocks.

21. A digital data storage media containing encoded data corresponding to instructions for a programmable processor implementing a method for providing an inline data conversion processing upon an incoming data stream as part of a data transfer, the method comprising:
receiving a packer stream address (PSA) associated with a transformation performed upon the incoming data stream;
decoding a first portion of the PSA to determine a transformation definition of the transformation performed upon the incoming data stream;
generating an outgoing data address associated with an outgoing data stream from a second portion of the PSA;
receiving the incoming data stream from a data source;
generating the outgoing data stream by applying the transformation definition to the incoming data stream; and
transmitting the outgoing data stream to a data destination.

22. The digital data storage media according to claim 21, wherein the data source comprises a digital data device attached to one of a plurality of data interfaces.

23. The digital data storage media according to claim 22, wherein the data destination comprises a digital data device attached to one of the plurality of data interfaces.

24. The digital data storage media according to claim 23, wherein the plurality of data interfaces comprises a host processor interface, a network interface, and a peripheral interface.

25. The digital data storage media according to claim 22, wherein the transformation definition comprises a byte swap definition corresponding to transforming the incoming data stream to the outgoing data stream by switching the byte order between a big endian byte order and a little endian byte order.

26. The digital data storage media according to claim 25, wherein the transformation definition further comprises a remote selection definition corresponding to selecting between the plurality of data input interfaces for use in generation of the output data stream.

27. The digital data storage media according to claim 26, wherein the transformation definition further comprises a non-data byte order transformation definition corresponding to a definition of a functional data transformation applied to the incoming data stream to generate the outgoing data stream.

28. The digital data storage media according to claim 21, wherein the outgoing data stream is generated by applying the transformation definition to the incoming data stream during successive data transfer cycles of a DMA data transfer option.

29. The digital data storage media according to claim 22, wherein the plurality of data interfaces provide data correspond to a 180-byte data blocks defined by 30 six-byte, 48 bit data words.

30. The digital data storage media according to claim 29, wherein the 180-byte data blocks are stored within contiguous storage blocks within 512-byte data blocks.

31. The digital data storage media according to claim 30, wherein two 180-byte data blocks are stored within each storage blocks, the storage blocks correspond to 512-byte data blocks.

* * * * *